United States Patent [19]

Kollarits et al.

[11] Patent Number: 5,784,138
[45] Date of Patent: Jul. 21, 1998

[54] FAST TRANSITION POLYMER DISPERSED LIQUID CRYSTAL SHUTTER FOR DISPLAY SCREEN AND METHOD OF MANUFACTURE THEREFOR

[75] Inventors: Richard V. Kollarits, Colts Neck; Jane D. LeGrange, Princeton; Timothy M. Miller, East Brunswick, all of N.J.

[73] Assignee: Lucent Technologies Inc., Murray Hill, N.J.

[21] Appl. No.: 700,916

[22] Filed: Aug. 22, 1996

[51] Int. Cl.$^6$ .................. G02F 1/1335; G02F 1/1333; G02F 1/13

[52] U.S. Cl. .................. 349/93; 349/10; 349/86; 349/183

[58] Field of Search .................. 349/10, 86, 93, 349/183

[56] References Cited

U.S. PATENT DOCUMENTS

| | | | |
|---|---|---|---|
| 4,671,618 | 6/1987 | Wu et al. | 350/347 V |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |
| 5,004,323 | 4/1991 | West | 349/89 |
| 5,159,445 | 10/1992 | Gitlin et al. | 358/85 |
| 5,243,413 | 9/1993 | Gitlin et al. | 358/55 |
| 5,278,681 | 1/1994 | Gitlin et al. | 359/48 |
| 5,401,437 | 3/1995 | Im | 252/105 |
| 5,437,811 | 8/1995 | Doane et al. | 252/299.01 |
| 5,455,083 | 10/1995 | Noh et al. | 359/36.62 |
| 5,645,758 | 7/1997 | Kawasumi et al. | 349/117 |

*Primary Examiner*—William L. Sikes
*Assistant Examiner*—Julie Ngo

[57] ABSTRACT

For use in the display screen of a teleconferencing system, a shutter capable of assuming alternative transparent and scattering states and a method of manufacture therefor. In one embodiment, the shutter includes a film of a polymer-dispersed liquid crystal (PDLC) composition of a polymer and a liquid crystal material wherein the liquid crystal material makes up about 78% by weight of the film. The film is cured at a temperature ranging from about 32° C. to about 38° C., thereby decreasing the time it takes for the film to switch between the transparent and scattering states. The shutter further includes first and second layers of a transparent conductor for containing the film therebetween and driver circuitry, coupled to the film, for causing the film to have a response time equal to or less than 8 ms.

38 Claims, 5 Drawing Sheets

FAST TRANSITION POLYMER DISPERSED LIQUID CRYSTAL SHUTTER FOR DISPLAY SCREEN AND METHOD OF MANUFACTURE THEREFOR

TECHNICAL FIELD OF THE INVENTION

The present invention is directed, in general, to display screens and, more specifically, to a polymer-dispersed liquid crystal ("PDLC") shutter for a teleconferencing system capable of transitioning rapid between alternative transparent and scattering states and a low parallax display screen employing the shutter.

BACKGROUND OF THE INVENTION

Teleconferencing was introduced decades ago in a simplified form with picture telephones wherein bidirectional video and audio links were established between calling and called parties. With the advent of personal, desktop computers, teleconferencing has assumed a more complex form. Digital images, such as text and graphics, are displayed on each conferee's terminal display screen, while video images of the conferees are also displayed in a portion of the display screen. The latter are made possible by positioning a camera to one side (top, bottom, left or right) of the display screen for recording images of the particular conferee viewing the display screen. Since the conferee naturally focuses attention on the display screen and because the camera is positioned off to one side of the display screen, eye contact is lacking between the conferee and the camera. This is known as "parallax"—a problem that arises when axes are misaligned, such as those of the camera and the display screen. Parallax is also a problem in the broadcasting industry where text prompting devices are employed.

Eye contact with the camera establishes eye-to-eye contact with each of the conferees shown on the display screen, thereby creating a feeling of interest among the conferees. Similarly, a lack of direct eye contact with the camera causes a loss of eye-to-eye contact with each of the conferees shown on the display screen that, in turn, creates a perception of disinterest or preoccupation.

From the perspective of the camera suffering a parallax problem, the conferee appears to be dozing when the camera is above the display screen, gazing to the left or right when the camera is right or left of the display screen or looking at the ceiling when the camera is below the display screen. As the conferee's scrutiny of the display screen becomes closer, the problem of parallax intensifies.

While some teleconferencing display terminals continue to be produced with an inherent parallax problem, conventional solutions have been proposed. One such solution involves a combination of a cathode ray tube ("CRT") display screen with a side-mounted camera focused on the conferee through a properly-angled beam splitter. The conferee can concentrate on the display screen while maintaining simultaneous eye contact with the camera. Although such a display terminal conquers the parallax problem, it cannot be overlooked that the cost of success is quite high. The CRT-beam splitter display terminal is extremely bulky, covering an area of several feet square. This is a significant portion of a standard desk surface. Bulkiness is an inherent problem caused by the introduction of a beam splitter.

U.S. Pat. No. 5,159,445, issued on Oct. 27, 1992, entitled "Teleconferencing Video Display System for Improving Eye Contact," commonly assigned with the present invention and incorporated herein by reference is directed to a video display system including a camera positioned behind, or opposite the viewing angle of, a display screen having first and second states of operation. As a result, the camera and the conferee are on opposite sides of the display screen. The display screen is controlled to switch from the first, or image display, state to the second, or substantially transparent, state. When the display screen is in the substantially transparent state, the camera is controlled to record images appearing on the viewing side of the display screen. Thus, this video display system achieves both direct eye-to-eye contact and compactness.

It has been found, however, that as display and camera frame rate increase, the light transmitted from the conferee to the camera through the display screen diminishes unacceptably, resulting in a reduction in image quality. The effect is particularly prominent in color display screens. Accordingly, U.S. Pat. No. 5,243,413, issued on Sep. 7, 1993, entitled "Color Parallax-Free Camera and Display," commonly assigned with the present invention and incorporated herein by reference is directed to a teleconferencing display terminal wherein the amount of light transmitted to the camera (the so-called "light budget") is increased. In the illustrated embodiment, light-attenuating devices present in a liquid crystal display ("LCD"), such as color filters, are repositioned out of the path of light entering the camera, allowing light transmission to increase without compromising the ability of the display screen to display color. The system introduces, in one embodiment, a shutter, mounted between the conferee and the LCD, that is capable of switching between transparent and scattering states in synchronicity with the LCD and the camera. In the transparent state, light is allowed to pass from the conferee through the shutter and the LCD to the camera. In the scattering state, the shutter behaves as a translucent, rear-projection screen to receive light from a projection lamp through the LCD. Conventionally, the shutter comprises a film of polymer-dispersed liquid crystal (PDLC) material under control of driver circuitry.

When the shutter is in its scattering state, it should have the properties of a good rear-projection screen. The PDLC material should act as a Lambertian scatterer, resulting in a display having brightness substantially independent of viewing angles. If the scattering is less than Lambertian, a bright spot will be apparent on the display corresponding to an image of the projection lamp. As scattering decreases, the projection lamp itself will become visible.

A further consideration in the design of the PDLC shutter is the residual scattering of the shutter in the transparent state. To the extent that light continues to be scattered in this state, image quality suffers.

Therefore, it is desirable that there be great contrast between the shutter's transparent and scattering states and that the shutter's transitions between transparent and scattering states are as swift as possible. At 60 Hertz, approximately 8 milliseconds (ms) is available for camera image acquisition and 8 ms for image display.

The most critical transition occurs when the shutter switches from transparent to scattering states. If the projection lamp is activated before the PDLC material has fully transitioned to the scattering state, the conferee will see the bright image of the projection lamp through the shutter. Of course, activation of the projection lamp may be delayed to accommodate the transition interval, but at the cost of a significant reduction in display screen brightness.

The physical properties inherent in the PDLC material govern the speed of this transition; variations in drive voltage and waveform are of no effect. Therefore, what is needed in the art is an improvement in the physical properties of a PDLC shutter for a teleconferencing system that will allow the shutter to transition between the transparent and scattering states faster, thereby improving display quality.

SUMMARY OF THE INVENTION

To address the above-discussed deficiencies of the prior art, the present invention provides, for use in the display screen of a teleconferencing system, a shutter capable of assuming alternative transparent and scattering states and a method of manufacture therefor. In a preferred embodiment, the shutter includes a film of a polymer dispersed liquid crystal (PDLC) composition comprising a polymer and a liquid crystal material wherein the liquid crystal material comprises from about 60% to about 90% by weight of the film. The liquid crystal preferably has a viscosity less than 40 cst (centistokes). Optimum liquid crystal morphology is achieved when the film is cured at a temperature ranging from about 30° C. to about 40° C. The present invention also includes first and second layers of a transparent conductive material for containing the film there between and driver circuitry, connected to the film, for causing the film to have a response time that is equal to or less than 8 ms.

The present invention therefore in a preferred embodiment introduces a PDLC shutter of a liquid crystal of a weight fraction or composition that minimizes droplet size to thereby decrease switching times, most notably, from the transparent state to the scattering state. In a preferred method of manufacture of the present invention, the polymer may be selected from those known in the art to be used in the manufacture of PDLC screen displays. However, in those embodiments where the polymer is produced by photopolymerization, as acrylate, vinyl ether or epoxy monomer is preferred, and in a more preferred embodiment, the monomer is an acrylate monomer. The polymerization is initiated, preferably by irradiating the homogenous mixture of monomer and liquid crystal with ultraviolet light having an intensity of at least one milliwatt per $cm^2$. Of course, however, it will be appreciated that the polymerization can be achieved by other methods as well, such as thermal initiation. The polymerized monomer-fraction of the PDLC is cured at an elevated temperature preferably above 30° C. and that more preferably ranges from about 35° C. to about 38° C. It has been unexpectedly found that the elevated temperatures within the stated ranges during cure lead to a film having a response time that is equal to or less than 8 ms.

In a preferred embodiment of the present invention, the liquid crystal comprises from about 75% to about 80% by weight of the film. In a more preferred embodiment, however, the liquid crystal comprises about 78% by weight of the film. In a manner to be described more fully, a film of about 78% liquid crystal material has been empirically determined to have optimal transition speed characteristics when cured at about 38° C.

In a preferred embodiment of the present invention, the film has a response time ranging from about 1 millisecond to about 8 milliseconds. More preferably, however, the film switches from the transparent state to the scattering state in about 1.3 ms. In some applications, such response times may not be necessary, however, the broad scope of the present invention contemplates faster response times of less than or equal to 1 ms.

In a preferred embodiment of the present invention, the film is contained in at least 5 μm thick cells. More preferably, however, the film is contained in about 20 μm thick cells, and exhibit faster switching times.

In a preferred embodiment of the present invention, the cells have a substantially uniform cell gap of at least 15 μm. In a more preferred embodiment, the cells have a substantially uniform cell gap of about 20 μm.

The foregoing has outlined, rather broadly, preferred and alternative features of the present invention so that those skilled in the art may better understand the detailed description of the invention that follows. Additional features of the invention that form the subject of the claims of the invention are described below. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
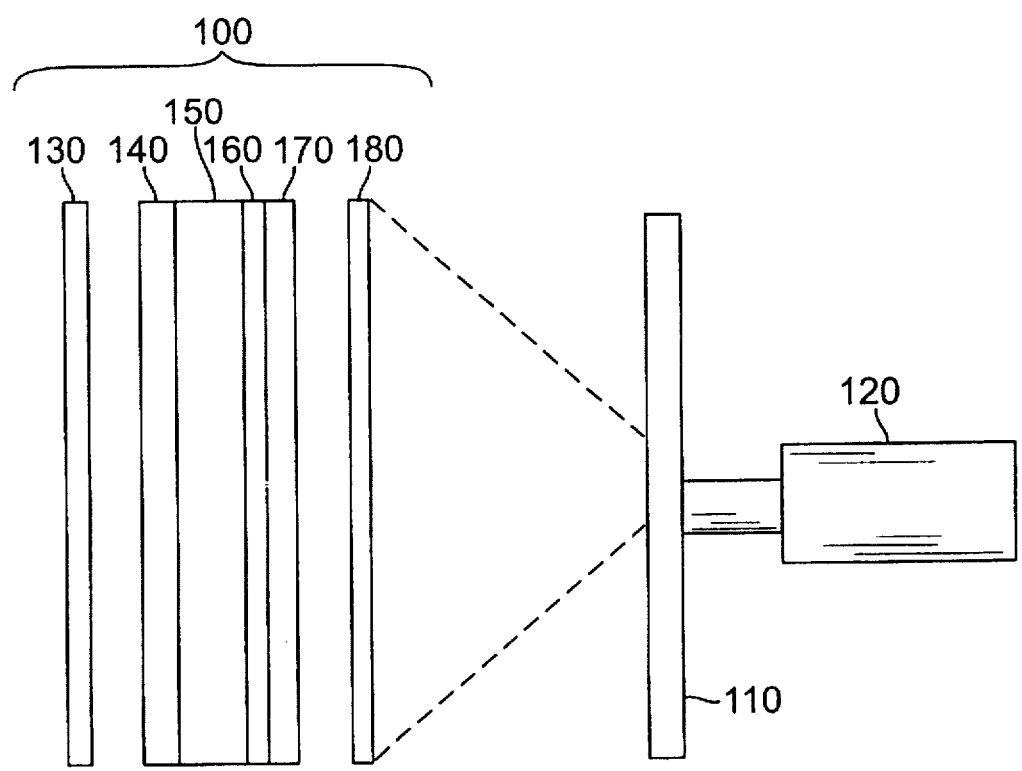
FIG. 1 illustrates a simplified block diagram of a conventional LCD screen, together with a light source and video camera.

Referring initially to FIG. 1, illustrated is a simplified block diagram of a conventional LCD screen 100, together with an area or distributed light source 110 and video camera 120. The LCD screen 100 is a single integrated unit that includes a front polarizer 130, front glass layer 140, liquid crystal 150, color filters 160, rear glass layer 170 and rear polarizer 180. The liquid crystal array 150 contains additional elements (not shown) including, without limitation, transparent conducting layer, circuit layer and alignment layers on both sides of the liquid crystal 150. The light passing through the layers of the LCD screen 100 to the video camera 120 is attenuated introducing losses therein. Images are displayed on the LCD screen 100 by illuminating white light through the rear polarizer 180 via the light source 110.

The rear polarizer 180 polarizes the light emanating from the light source 110. The cells of the liquid crystal screen 100 are independently controllable. Each liquid crystal cell operates by rotating the polarization direction of the light passing through it. The angle through which the polarization is rotated in each liquid crystal cell depends upon the voltage applied to it. After passing through the liquid crystal array 150, the light passes through the front polarizer 130 to a user viewing the LCD screen 100.

Three cells in combination form the pixels that constitute the LCD screen 100. The cells, synonymously designated subpixels, are associated with a respective one of red, green or blue color filters. To produce a color on the LCD screen 100, the light passes through the color filters 160 and is therein proportioned with the three subpixels to achieve a desired color.

When the LCD screen 100 passes light to the video camera 120, the presence of the color filters 160 and other elements of the LCD screen 100 reduce the amount of light transmitted to the video camera 120 An optimal color filter 160 allows about one-third of the white light to pass therethrough. Typically, color filters 160 pass less than one-hundred percent of the light in their passband thereby blocking at least two-thirds of the white light passing through their cells. For instance, the red light is blocked by the green and blue filters; the green light is blocked by the red and blue filters; the blue light is blocked by the red and green filters.

Figure 2:
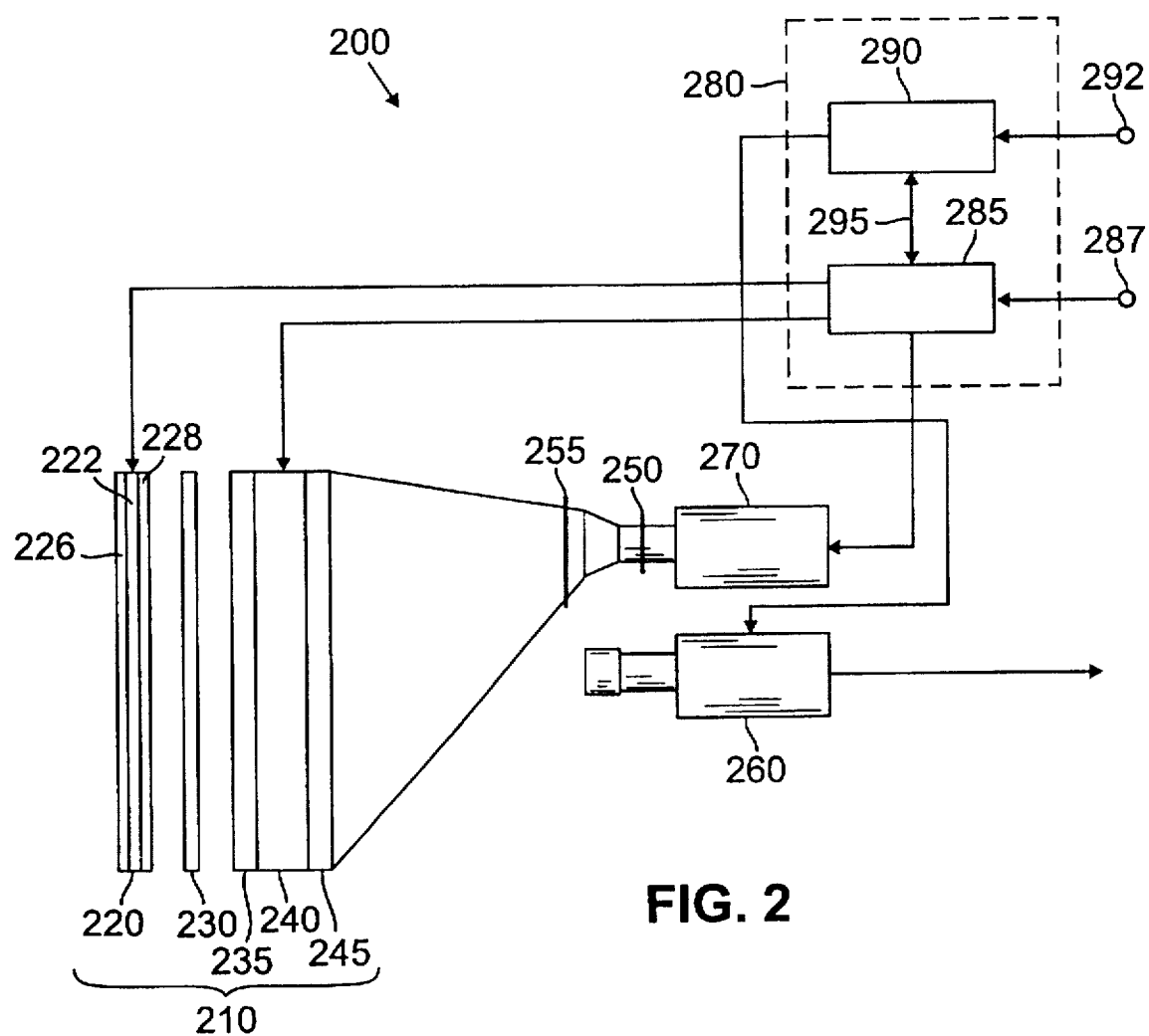
FIG. 2 illustrates a simplified block diagram of a video display system employing a display screen incorporating an embodiment of a PDLC shutter constructed according to the principles of the present invention.

Turning now to FIG. 2, illustrated is a simplified block diagram of a video display system 200 employing a display screen 210 incorporating an embodiment of a PDLC shutter 220 constructed according to the principles of the present invention. Along with the display screen 210, the video display system 200 includes a video camera 260, light source or projection lamp 270 and driver circuitry 280. The display screen 210 includes the PDLC shutter 220 and a front polarizer 230, front glass layer 235, liquid crystal array 240, rear glass layer 245, color filters 250 and rear polarizer 255. The color filters 250 and rear polarizer 255 are located in the path of the light source 270, but not in the path of the video camera 260 to increase the light from the front polarizer 230 to the video camera 260 while maintaining the color capability of the display screen 210.

In the illustrated embodiment, the light source 270 is a dot or stripe projector that projects a two dimensional array of red, green and blue dots or stripes of polarized light through the back surface of the liquid crystal array 240 to the back surface of the PDLC shutter 220. The red, green and blue dots are permanently focused on one of three subpixels that form each pixel of the display screen 210 during the manufacturing process. The front polarizer 230 in conjunction with the liquid crystal array 240 attenuates and modulates the intensity of the dots of polarized, colored light. The PDLC shutter 220 diffuses the dots of polarized, colored light to form an image on the display screen 210.

Although the principles of the present invention are described in the context of a twisted nematic liquid crystal display, it should be apparent to one of ordinary skill in the related art that the principles of the present invention are equally applicable to other video display systems incorporating different display screens. For instance, the principles of the present invention can be implemented in a system employing a flat screen display such as a ferro-electric liquid crystal display.

The video camera 260 is mounted in a centralized position behind the display screen 210 (i.e., such that the PDLC shutter 220 is centered about an optical axis of the video camera 260) in a line of sight with a user looking at the display screen 210. The positioning of the video camera 260 eliminates parallax by maintaining direct eye contact between the video camera 260 and the user. The video camera 260 employs an electrical, optical or mechanical shutter (not shown) to prevent light from the projector 270 reaching the video camera 260 when the video camera is on. The video camera 260 should have sufficient light sensitivity to maintain an acceptable video output to the user positioned at a normal viewing distance from the front polarizer 230 when recording images. The transparency of the display screen 210 can be optimized to minimize any losses of the available light. Any standard video camera 260 may be employed to advantage; any charge coupled device ("CCD") sensored array or camera having imaging tubes may also be employed together with the appropriate lens and focusing and shuttering apparatus.

The PDLC shutter 220, video camera 260 and light source 270 are multiplexed to provide two modes of operation, namely, the scattering mode image display and transparent mode image acquisition. In the scattering mode, information is displayed on the PDLC shutter 220 via the light source 270 while the video camera 260 is inactive. In the transparent mode, the video camera 260 integrates light to produce a video representation of a captured image of the user. In this mode of operation, the light source 270 is inactive and the PDLC shutter 220 is substantially transparent. The shutter 220 has a response time that can range from about 1 millisecond (ms) to about 8 ms; that is, the shutter, in a preferred embodiment, switches from the transparent state to the scattering state within that range. However, in a more preferred embodiment, the shutter 220 has a response time that is less than or equal to 1 ms. In some applications, such switching speeds may not be necessary. However, the broad scope of the present invention contemplates switching speeds faster than 1.3 ms. The video display system 200 also incorporates a 50% duty cycle between the image display mode and image display mode, although other ratios of duty cycles are well within the scope of the present invention. Regardless, the rate and ratio that the video display 210 and video camera 260 operate are selected to minimize flicker therein.

The PDLC shutter 220 includes droplets or bubbles of liquid crystal 222 dispersed in a polymer matrix film. The PDLC shutter also includes first and second layers 226, 228 of transparent conductive material for containing the film 222 therebetween. Preferably, the first and second layers 226, 228 are glass plates that are coated with a conventional transparent conductive material that allows the plates to act as electrodes. The first and second layers 226, 228 are coupled to the driver circuitry 280 to thereby cause the film 222 to switch between the transparent and scattering states. In a preferred embodiment, the combination of larger cell gaps that preferably range from about 5 μm to about 20 μm, lower viscosity liquid crystal below 40 cst, a liquid crystal fraction that ranges from about 60% to about 90%, and elevated photopolymerization temperatures that range from about 30° C. to about 40° C. during the curing process provide a film that produces a PDLC film with a morphology that switches more rapidly from the transparent state to the scattering state.

In a preferred embodiment, the film 222 is formed from a polymer dispersed, liquid crystal material composition wherein the liquid crystal comprises from about 60% to about 90% by weight of the film 222. More preferably, however, the film 222 is comprised from about 75% to about 80% by weight of liquid crystal, and in an even more preferred embodiment, the film 222 comprises about 78% by weight of liquid crystal. The film 222 is cured at temperatures ranging from about 30° C. to about 40° C. and more preferably, is cured at a temperature of 38° C. It has been unexpectedly found that curing the film with the stated liquid crystal fractional weight within the above-stated temperature range results in a film that switches from the transparent state to the scattering state in no more than 1.3 ms and at a voltage of about 140 volts RMS for a 20 μm thick film.

The polymer may be one of several selected from a group of polymers that are known in the PDLC art. In these embodiments, the phase separation that forms the dispersion occurs upon polymerization of the monomer mixture and liquid crystal. A preferable commercially available example of the liquid crystal mixture used in the PDLC shutter of the present invention is LICRILITE® TL216, which is available from Merck House, Poole, Dorset, BH15 1TD, England. This particular liquid crystal has the following physical properties: 1)S to N transition of <−20° C., 2)a clearing point of 80.3° C., 3)viscosity at +20° C. of 36, cSt, 4)dielectric anistropy $\Delta\epsilon$ 1 kHz at 20° C. is 5.5, $\epsilon_{\parallel}$ 1 kHz at 20° C. is 9.7, $\epsilon\perp$ 1 kHz at 20° C. is 4.2, 5)optical anistropy (20° C., 589 nm) $\Delta n$ of 0.2106, $n_o$ of 1.5234, $n_e$ of 1.7340, 6) multiplex properties measured at 90° twist V(90,0,20) (saturation) 3.53V, V(10,0,20) (threshold) 2.63V 7)elastic constants $K_1$ at +20° C. 14.40 $10^{-12}$N, $K_3$ +20° C. 19.60 $10^{-12}$N and $K_3/K_1$ of 1.36.

In such embodiments, the monomer is mixed with the liquid crystal material in the above-stated weight fraction ranges given for the liquid crystal material to form a homogeneous mixture. The homogeneous mixture is positioned between the two glass plates 226, 228, and is then subjected to conditions that cause the monomer to polymerize while mixed with the liquid crystal material to form a polymer matrix about the liquid crystal material. In a preferred embodiment, the polymerization is initiated by exposing the homogeneous mixture to ultra violet light at an intensity of at least one milliwatt per cm$^2$ for a total dose of at least about 6.4 cm$^2$. Of course, it will be appreciated by those of ordinary skill in the art that other processes may be used to initiate the polymerization as well. During polymerization, the mixture is preferably cured at a temperature above 30° C. In a more preferred embodiment, the mixture is cured at temperature ranging from about 35° C. to about 40° C., and more preferably, at about 38° C. The monomer is preferably selected from the group consisting of acrylate, vinyl ethers or epoxies, and the liquid crystal is selected to have a birefringence greater than 0.2.

As the monomer undergoes polymerization, the resulting polymer separates from the liquid crystal material, and thus, forms a polymer matrix about the liquid crystal material that results in a liquid crystal drop-size and morphology that provides an optimal response time.

In the illustrated embodiment, the film contains about 78% liquid crystal material, although other percentages of liquid crystal material are well within the scope of the present invention. Additionally, the film 222 is contained in about 20 μm cells that comprise the PDLC shutter 220. However, the broad scope of the present invention encompasses cells of any size, spacing or degree of uniformity.

Synchronization between the PDLC shutter 220, video camera 260 and light source 270 is maintained by the drive circuitry 280 including a display processor 285 and control circuitry 290. Again, the driver circuitry 280 provides rapid time switching between the transparent and scattering modes to allow the user to view images on the display screen 210 at apparently the same time the video camera 260 is recording images of the user. The driver circuitry 280 receives images destined for the display screen 210 via a video in lead 287. The control circuit 285 develops synchronization from an externally supplied signal on a sync lead 292. The control circuit 285 employs industry standard internal circuitry (not shown) to manage the operation of the PDLC shutter 220, video camera 260 and light source 270. The display processor 290 converts the input video images to a format compatible with the display screen 210 and, also, controls the operation of the light source 270.

The driver circuitry 280 generally operates as follows. The synchronization signal is supplied externally via the sync lead 292. The synchronization signal typically is supplied by a device external to the video display system 200, but may alternatively be supplied from the video camera 260 or display processor 285. The synchronization signal provides a reference for establishing the time intervals based upon, for instance, a recording period of the video camera 260 or image display period of the display screen 210. Coordination between the display processor 285 and control circuitry 290 in the driver circuitry 280 is established by signals on a control lead 295.

An additional advantage of positioning the rear polarizer 255 out of the path of the video camera 260 is that there is no longer a requirement to multiplex the liquid crystal array 240 between displaying information and a clear state for image acquisition. Although the video camera 260 receives polarized light whose orientation depends on display information (due to the operation of the front polarizer 230), the liquid crystal array 240 is effectively clear to the video camera 260 because the video camera 260 is insensitive to polarization. Thus, the alignment of the rear polarizer 255 eliminates the effect of the state of the liquid crystal array 240 on the video camera 260. While application of the present invention has been discussed with respect to a display screen, it should be understood that the display screen is an example of but one use for a film having fast response times and that there are many other applications in which the PDLC film of the present invention may be used.

Figure 3:
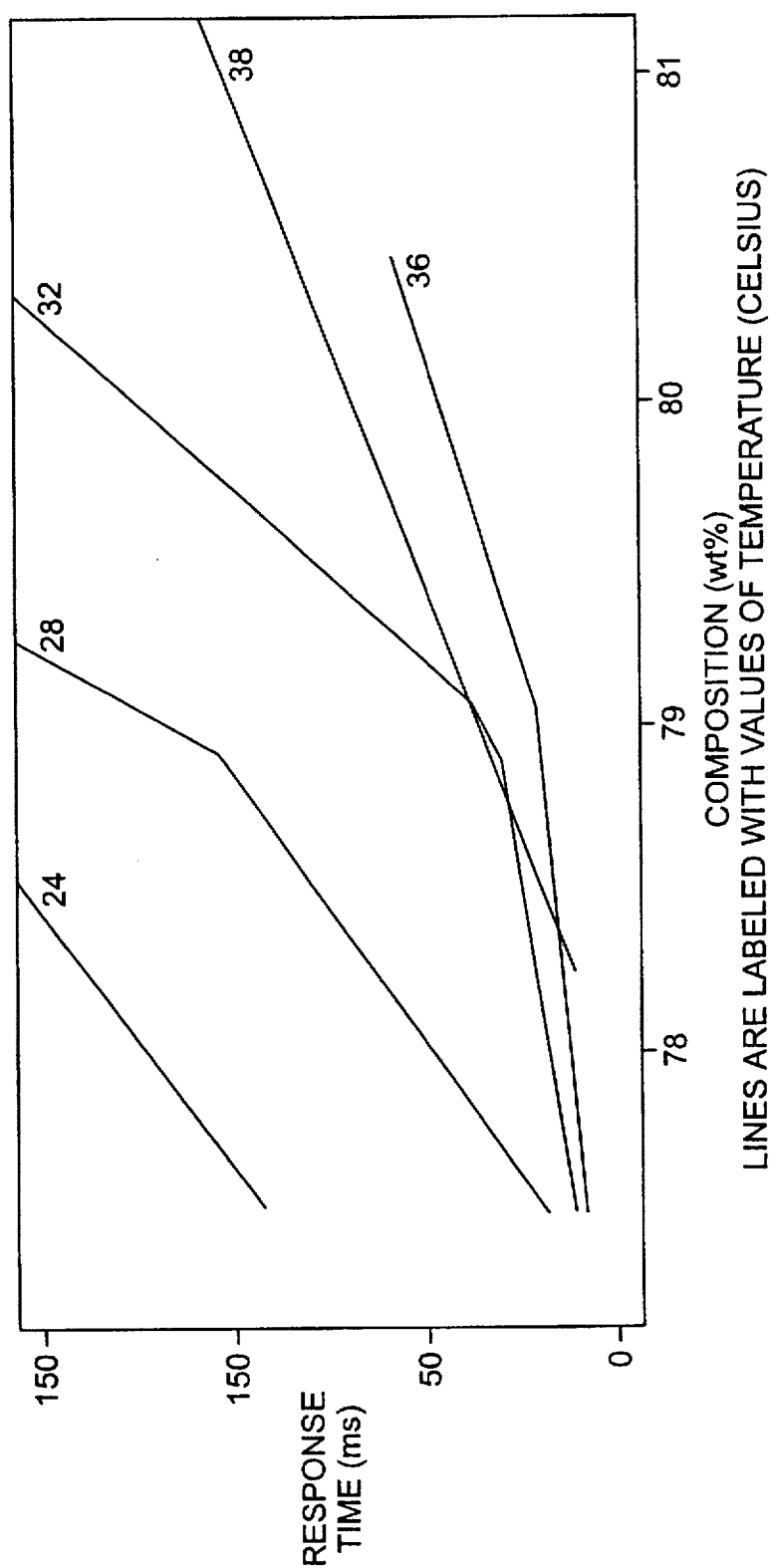
FIG. 3 illustrates a graph of response time measurements as a function of composition for different temperatures as measured for a series of 8 μm thick test cells.
Figure 4:
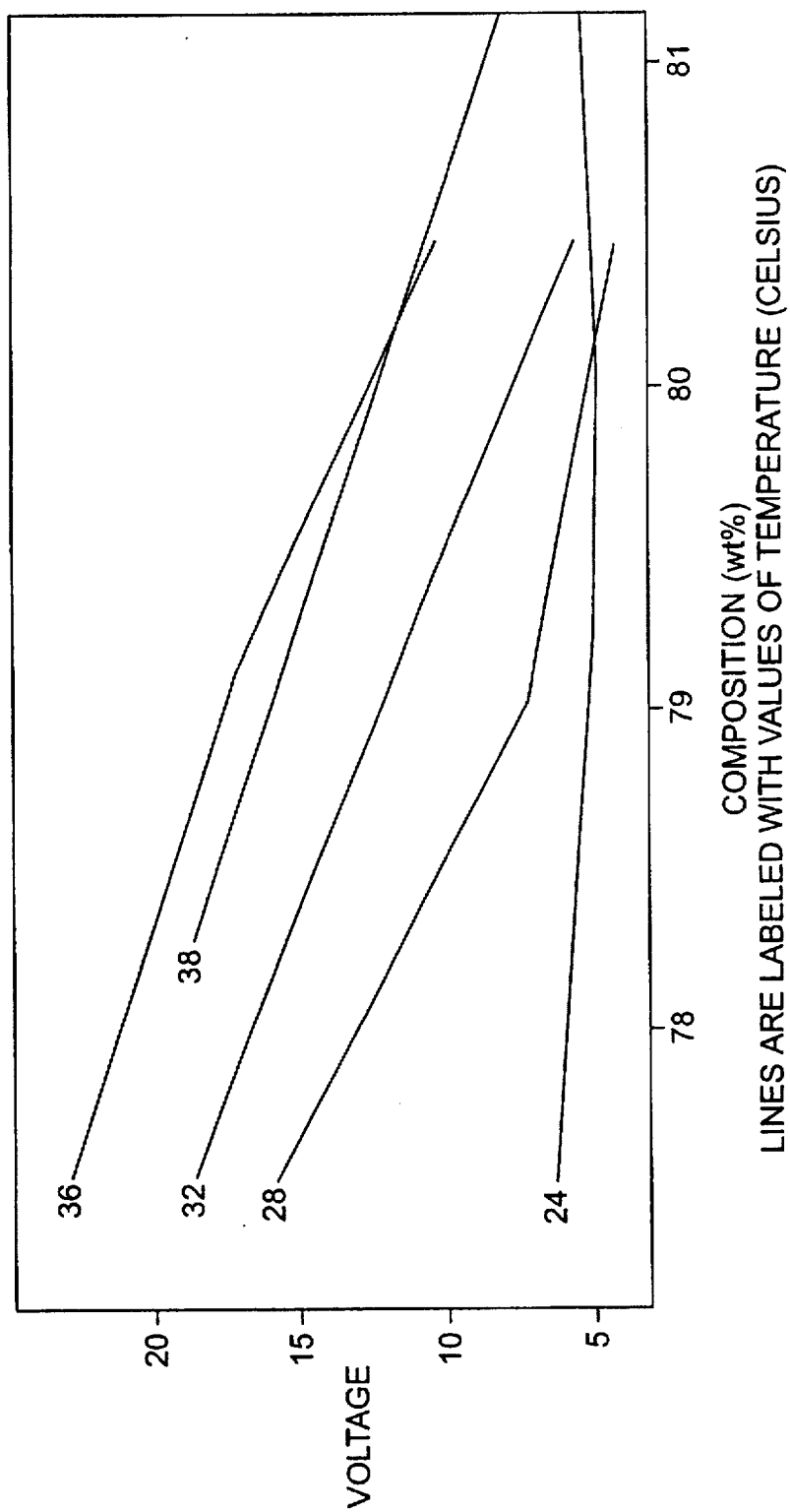
FIG. 4 illustrates a graph of switching voltage data as a function of the liquid crystals fractional weight for different temperatures.

Turning now to FIG. 3, there is illustrated a graph of measured response times for individual test cells in milliseconds (ms) plotted as a function of percent liquid crystal in the film for various polymerization temperatures. These individual test cells were made and used to establish general trends from which a PDLC shutter incorporating the film of the present invention was constructed. These data are reflected in TABLE I below and are illustrated in FIGS. 3 and 4 and generally show that the fastest response times (L OFF) of about 8 ms results from compositions having about 78% weight liquid crystal at cure temperatures ranging between 32° C. and 38° C.

TABLE I

| Example | CELL/GAP | COMP (% LC) | TEMP (°C.) | VOLTS | L OFF (ms) |
|---|---|---|---|---|---|
| 1 | 8 μm | 78.2 | 24.0 | 7.4 | 108.2 |
| 2 | 8 μm | 78.2 | 24.0 | 5.9 | 170.6 |
| 3 | 8 μm | 78.2 | 39.0 | 18.5 | 11.4 |
| 4 | 8 μm | 78.2 | 38.0 | 18.8 | 9.6 |
| 5 | 8 μm | 81.9 | 38.0 | 4.8 | 152.4 |
| 6 | 8 μm | 81.9 | 38.0 | 6.1 | 112.6 |
| 7 | 8 μm | 81.9 | 24.0 | 6.2 | 73.2 |
| 8 | 8 μm | 81.9 | 24.0 | 5.6 | 116.2 |
| 9 | 8 μm | 80.2 | 31.0 | 6.3 | 176.6 |
| 10 | 8 μm | 77.5 | 24.0 | 12.0 | 49.6 |
| 11 | 8 μm | 77.5 | 32.0 | 19.0 | 11.4 |
| 12 | 8 μm | 77.5 | 28.0 | 15.9 | 22.3 |
| 13 | 8 μm | 77.5 | 36.0 | 22.8 | 12.1 |
| 14 | 8 μm | 79.1 | 36.0 | 17.2 | 21.1 |
| 15 | 8 μm | 79.1 | 24.0 | 4.9 | 295.0 |
| 16 | 8 μm | 79.1 | 28.0 | 7.2 | 138.0 |
| 17 | 8 μm | 80.4 | 24.0 | 5.0 | 213.0 |
| 18 | 8 μm | 80.4 | 36.0 | 10.7 | 56.4 |
| 19 | 8 μm | 80.4 | 32.0 | 5.8 | 190.0 |
| 20 | 8 μm | 80.4 | 28.0 | 4.7 | 337.0 |
| 21 | 8 μm | 80.4 | 36.0 | 5.0 | 59.6 |
| 22 | 8 μm | 78.9 | 24.0 | 4.7 | 315.0 |
| 23 | 8 μm | 78.9 | 28.0 | 7.5 | 94.4 |
| 24 | 8 μm | 78.9 | 32.0 | 47.7 | 38.6 |

TABLE I-continued

| Example | CELL/GAP | COMP (% LC) | TEMP (°C.) | VOLTS | L OFF (ms) |
|---------|----------|-------------|------------|-------|------------|
| 25 | 8 μm | 80.0 | 24.0 | 4.7 | 238.0 |
| 26 | 8 μm | 80.0 | 28.0 | 4.5 | 306.0 |
| 27 | 8 μm | 80.0 | 32.0 | 7.6 | 97.5 |
| 28 | 8 μm | 78.9 | 24.0 | 4.8 | 239.0 |
| 29 | 8 μm | 78.9 | 24.0 | 4.7 | 199.5 |

For instance, in Example 4, a test cell with a thickness of 8 μm was constructed with about 78.2% weight liquid crystal. The liquid crystal used to construct the test cells was LICRILITE® TL213, which is available from Merck House, Poole, Dorset, BH15 1TD, England. This particular liquid crystal has the following physical properties: 1)S to N transition at <−20° C., 2)a clearing point of 87.7° C., 3)viscosity at +20° C. of 36, eSt. 4)dielectric anisotropy $\Delta\epsilon$ 1 kHz at 20° C. of 5.7, $\epsilon_{\parallel}$ 1 kHz at 20° C. of 10.0, $\epsilon\perp$ 1 kHz at 20° C. is 4.3, 5)optical anistropy (20° C., 589 nm) $\Delta n$ of 0.2388, $n_o$ of 1.5271, $n_e$ of 1.7659.6)elastic constants $K_1$ at +20° C. 16.80 $10^{-12}$N, $K_3$+20° C. 22.00 $10^{-12}$N and $K_3/K_1$ of 1.30. The liquid crystal/monomer mixture was cured at a temperature of 38° C., which yielded a test cell having a response time (L OFF) of 9.6 ms and a switching voltage of about 18.8. In another example, the test cell of Example 11 was constructed having 77.5% weight liquid crystal. The monomer and liquid crystal mixture was cured at 32° C. resulting in a test cell having a response time of 11.4 ms and a switching voltage of 19.0 volts. In another example, the test cell of Example 13 having a 77.5% weight liquid crystal was constructed and cured at a temperature of about 36° C. This combination resulted in a test cell having a response time of about 12.1 ms and a switching voltage of about 22.8 volts.

In contrast, however, the test cell of Example 5 was constructed having 81.9% weight liquid crystal and cured at a temperature of 38° C. As shown in TABLE I, the response time for this test cell was 152.4 ms at a switching voltage of 4.8 volts. In another contrasting example, the test cell of Example 12 having a 77.5% weight liquid crystal was constructed and cured at 28° C. As shown in TABLE I, this combination resulted in a test cell having a response time of 22.3 ms at a switching voltage of 15.9 volts. In yet another example, the test cell of Example 22 was constructed having 78.9% weight liquid crystal and cured at 24.0° C. This resulted in a test cell having a response time of 315 ms at a switching voltage of 4.7 volts.

As seen from TABLE I and FIG. 3, the test cells with a weight liquid crystal fraction between about 77% and about 79% that are cured at temperatures between about 32° C. and about 38° C. produced test cells with faster response times than those test cells where the curing temperatures were less than 32° C. and greater than 38° C. in those same liquid crystal percent weight ranges. Even in those mixtures where the weight percent liquid crystal is about 78%, the response times were slower than the mixtures cured at temperatures of less than 32° C. and greater than 38° C. Therefore, as it can be seen from the foregoing, both the weight percent of liquid crystal between about 77% and 79% and the cure temperatures between about 32° C. and about 38° C. are important in achieving a test cell and thus a shutter with a faster response time.

Turning now to FIG. 4, illustrated are measured switching voltages plotted as a function of weight percent liquid crystal. These data were also taken from TABLE I. While it is well known by those skilled in the art that faster response times require higher voltages and slower response times require significantly lower voltages, it was unexpectedly found that test cells having about 78% weight liquid crystal cured at temperature ranging from about 32° C. to about 38° C. gave faster response times.

For example, as reflected in TABLE I and as illustrated in FIG. 4, the test cell of Example 4 was constructed having 78.2% weight liquid crystal and cured at a temperature of 38° C. This test cell required a switching voltage of about 19 volts. In yet another case, the test cell of Example 13 was constructed having 77.5% weight liquid crystal cured at a temperature of 36.0° C. This test cell required a switching voltage of about 22.8 volts. In contrast, however, the test cell of Example 15 was constructed having 79.1% weight liquid crystal cured at a temperature of 24° C. This produced a test cell that required a switching voltage of about 4.9 volts. Thus, as generally seen from TABLE I and FIG. 4, the test cells having the faster response times comprising from about 77% to about 79% weight liquid crystal cured at temperatures from about 32° C. to about 38° C. required higher voltages.

Figure 5:
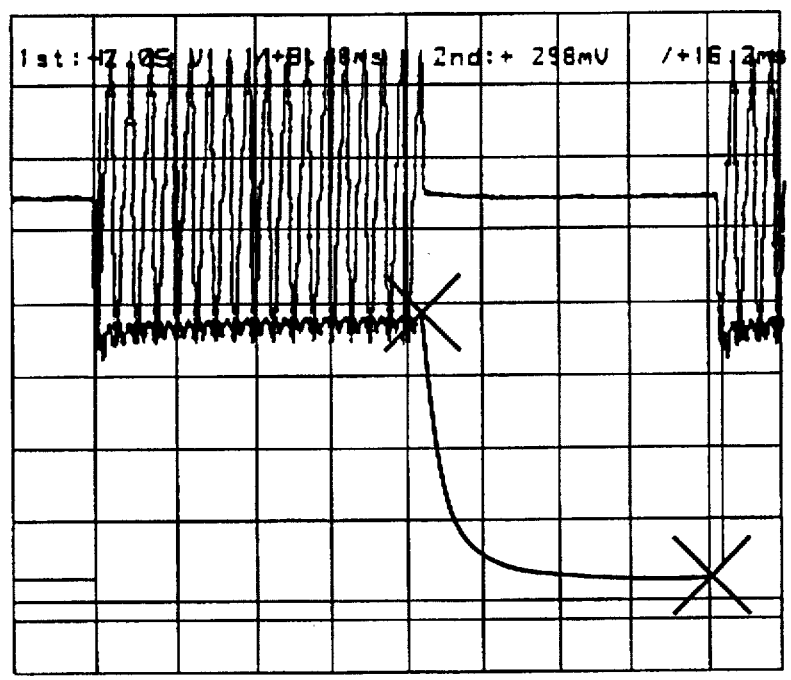
FIG. 5 illustrates an oscilloscope trace of transition times for a PDLC shutter constructed according to the principles of the present invention.

From these general trends for the individual test cells, a PDLC shutter was constructed. The shutter film was made from a 78% weight liquid crystal of LICRILITE® and was cured at 38° C. The shutter thickness was 20 μm. Turning now to FIG. 5, illustrated is an oscilloscope trace 500 of transition times for the 20 μm thick PDLC shutter driven by drive voltage waveform 540 and that is constructed according to the principles of the present invention. As can be seen, the decay from the transparent state 510 to the scattering state 520 is approximately exponential. An exponential decay curve 530 demonstrates the transition time between the transparent and scattering states 520, 530 of about 1.3 ms.

With continuing reference to FIGS. 3–5, a PDLC shutter, having a fast response time between transparent and scattering states, may be selected by altering the liquid crystal composition and temperature of the PDLC shutter as discussed above. The PDLC electro-optic properties can therefore be controlled over a large response space by varying the above referenced characteristics in correspondence with the phase diagram of the monomer/liquid crystal mixture. Employing a composition of about 78% liquid crystal and setting the temperature, during polymerization, between 32° C. and 38° C. results in a PDLC shutter requiring a higher drive voltage and having a faster response time. The aforementioned cure conditions lead to a morphology of relatively smaller (<0.5 μm) liquid crystal droplets; it is well known that smaller droplets switch at higher voltages and exhibit shorter switching times from the transparent to scattering states.

The oscilloscope trace 500 demonstrates an even faster response time, in the range of 1.3 ms, than measured in prior art shutter devices. As previously mentioned, the PDLC shutter of the present invention acts more nearly as a Lambertian scatterer due to the thickness of the shutter and to the morphology of the smaller drops obtained by curing the monomer at elevated temperatures.

Although the present invention has been described in detail, those skilled in the art should understand that they can make various changes, substitutions and alterations herein without departing from the spirit and scope of the invention in its broadest form.

What is claimed is:

1. A method of manufacturing a shutter, said shutter capable of assuming alternative transparent and scattering states, said method comprising the steps of:

initiating a phase separation of a polymer and liquid crystal to form a polymer dispersed liquid crystal (PDLC) film wherein said liquid crystal material ranges from about 60% to about 90% by weight of said PDLC film; and curing said film at a temperature from about 30° C. to about 40° C., said film having a response time of equal to or less than 8 ms.

2. The method as recited in claim 1 wherein said liquid crystal material comprises from about 75% to about 80% by weight of said PDLC composition.

3. The method as recited in claim 2 wherein said liquid crystal material comprises about 78% by weight of said PDLC composition.

4. The method as recited in claim 1 wherein said elevated temperature ranges from about 32° C. to about 40° C.

5. The method as recited in claim 4 wherein said elevated temperature is about 38° C.

6. The method as recited in claim 1 wherein said film is contained in at least 5 μm thick cells.

7. The method as recited in claim 6 wherein said cells are substantially uniformly spaced apart by at least 15 μm.

8. The method as recited in claim 1 wherein said step of initiating said phase-dispersion includes the steps of mixing a monomer with said liquid crystal to form a homogeneous mixture wherein said liquid crystal material ranges from about 60% to about 90% by weight of said homogeneous mixture and polymerizing said monomer to form liquid crystal drops within a polymer matrix, thereby resulting in said phase-dispersed liquid crystal composition.

9. The method as recited in claim 8 wherein said monomer is selected from the group consisting of:
   a). acrylates
   b). vinyl ethers and
   c). epoxies.

10. The method as recited in claim 8 wherein said step of polymerizing includes irradiating said homogeneous mixture with ultraviolet light at an intensity of at least one milliwatt per $cm^2$.

11. The method as recited in claim 1 wherein said liquid crystal has a viscosity lower than 40 cst.

12. The method as recited in claim 1 wherein said response time ranges from about 1 millisecond to about 8 milliseconds.

13. The method as recited in claim 12 wherein said response time is about 1 millisecond.

14. For use in a teleconferencing system, a shutter capable of assuming alternative transparent and scattering states, comprising:

a film of a polymer-dispersed liquid crystal (PDLC) composition comprising a polymer and a liquid crystal wherein said liquid crystal material comprises from about 60% to about 90% by weight of said film, said film polymerized at a temperature ranging from about 30° C. to about 40° C., said film having a response time equal to or less than 8 ms;

first and second layers of transparent material for containing said film therebetween; and driver circuitry, coupled to said film, for causing said film to switch between said transparent and scattering states.

15. The shutter as recited in claim 14 wherein said liquid crystal comprises from about 75% to about 80% by weight of said film.

16. The shutter as recited in claim 15 wherein said liquid crystal comprises about 78% by weight of said film.

17. The shutter as recited in claim 14 wherein said elevated temperature ranges from about 32° C. to about 40° C.

18. The shutter as recited in claim 14 wherein said response time ranges from about 1 millisecond to about 8 milliseconds.

19. The shutter as recited in claim 18 wherein said response time is about 1 millisecond.

20. The shutter as recited in claim 14 wherein said film is contained in at least 5 μm thick cells.

21. The shutter as recited in claim 20 wherein said cells are substantially uniformly spaced apart by at least 15 μm.

22. The shutter as recited in claim 14 wherein said polymer comprises a phase separated polymer.

23. The shutter as recited in claim 22 wherein said polymerization of said phase separated polymer is initiated by irradiating a homogeneous mixture of a monomer and said liquid crystal with ultraviolet light at an intensity of at least one milliwatt per $cm^2$.

24. The shutter as recited in claim 23 wherein said monomer is selected from the group consisting of:
   a). acrylate
   b). vinyl ethers and
   c). epoxies.

25. The method as recited in claim 14 wherein said liquid crystal has a viscosity lower than 40 cst.

26. A display screen for a teleconferencing system, comprising:

a liquid crystal display (LCD) capable of assuming alternative transparent and display states;

LCD driver circuitry, coupled to said LCD, for supplying data to said LCD for display thereof and causing said LCD to switch between said transparent and display states;

a video camera located on a first side of said LCD;

a projection lamp located on said first side of said LCD;

a shutter, located on a second side of said LCD, capable of assuming alternative transparent and scattering states and including a film of a polymer-dispersed liquid crystal (PDLC) film comprising a polymer and a liquid crystal wherein said liquid crystal comprises from about 60% to about 90% by weight of said film, said film cured at a temperature ranging from about 30° C. to about 40° C. and having a response time equal to or less than 8 ms; and shutter driver circuitry, coupled to said film and operating in conjunction with said LCD driver circuitry, for causing said shutter to switch between said transparent and scattering states, said camera capable of receiving light transmitted through said shutter and said LCD when said shutter and said LCD are in said transparent states, said shutter acting as a rear-projection screen for imaging light generated by said projection lamp and transmitted through said LCD when said LCD is in said display state and said shutter is in said scattering state.

27. The display screen as recited in claim 26 wherein said liquid crystal comprises from about 75% to about 80% by weight of said film.

28. The display screen as recited in claim 27 wherein said liquid crystal comprises about 78% by weight of said film.

29. The display screen as recited in claim 26 wherein said elevated temperature ranges from about 32° C. to about 40° C.

30. The display screen as recited in claim 26 wherein said response time equal to or less than 1 millisecond.

31. The display screen as recited in claim 30 wherein said response time is about 1 millisecond.

32. The display screen as recited in claim 26 wherein said film is contained in at least 5 μm cells.

33. The display screen as recited in claim 32 wherein said cells are substantially uniformly spaced apart by at least 15 µm.

34. The shutter as recited in claim 26 wherein said polymer comprises a phase separated polymer.

35. The display screen as recited in claim 34 wherein a polymerization of said phase separated polymer is initiated by irradiating a homogeneous mixture of a monomer and said liquid crystal with ultraviolet light at an intensity of at least one milliwatt per cm$^2$.

36. The display screen as recited in claim 35 wherein said monomer is selected from the group consisting of:

a). acrylate b). vinyl ethers and c). epoxies.

37. The display screen as recited in claim 26 wherein said liquid crystal has a viscosity less than 40 cst.

38. The display screen as recited in claim 26 wherein said film is contained between first and second layers of a transparent conductor material.

* * * * *